3,291,980
COMBINED CHROMATOGRAPH AND MASS SPEC-
TROMETER ANALYZING APPARATUS
Vincent J. Coates, Westport, and Edward B. Delaney,
Ridgefield, Conn., assignors to The Perkin-Elmer Cor-
poration, Norwalk, Conn., a corporation of New York
Filed Nov. 29, 1963, Ser. No. 326,973
5 Claims. (Cl. 250—41.9)

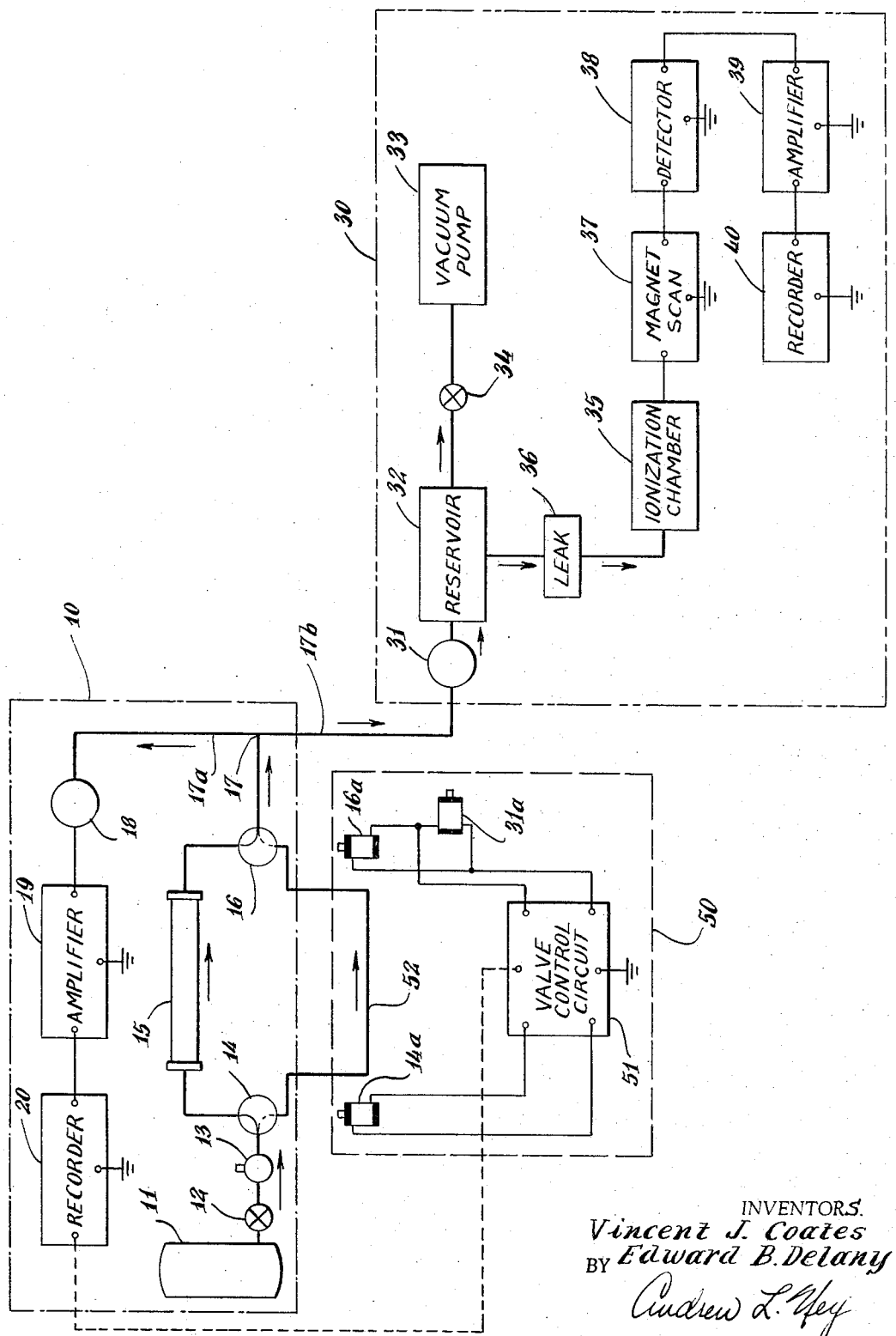

General

The present invention relates to apparatus for analyzing mixtures and for providing qualitative and quantitative data of the components of the mixture being analyzed.

In many laboratory and industrial applications it is necessary to determine the identity and amount of the components of a mixture. In many such analyses the first step is to separate the components so that each one may be examined individually. A chromatographic system has been and still is commonly used to perform this function. A chromatograph is also capable of providing quantitative data of the components which it separates.

After the components are separated, a common practice is to supply them to a mass spectrometer or an infrared spectrometer or similar type of apparatus capable of identifying each component. The spectrometers provide frequency spectrums of the components which identify the components, since different components have different spectrums.

The use of a chromatographic system may, in certain applications, pose some problems. Normal operation of the chromatographic column results in the generation of pure fractions as a function of time, or more correctly, as a function of the rate of flow of carrier through the column. If the flow of carrier during a chromatographic sample separation is to be uninterrupted or unaltered, the apparatus for identifying the components, for example, a mass spectrometer, must be capable of analyzing a component in the periods between the times at which the components appear at the output of the chromatographic system. If the identifying apparatus or its recording equipment are not fast enough, components separated by the chromatographic system are likely to recombine so that a single analysis of the identifying apparatus provides combined data of two or more components rather than separate data of each component.

Oftentimes, it is either imposible or impractical to make the identifying apparatus or its recording equipment operate more quickly. While various techniques have been suggested to overcome this problem, the result has been either a degradation in performance of the apparatus or a requirement for more expensive and sophisticated equipment.

It is, therefore, an object of the present invention to provide new and improved apparatus for analyzing a mixture.

In accordance with the present invention apparatus for analyzing a mixture comprises a means responsive to the mixture for separating the components of the mixture and means responsive to the components for identifying the components. The invention further includes means for controlling the rate at which the components are supplied to the identifying means.

For better understanding of the present invention, together with other and further objects thereof, reference is had to the following description, taken in connection with the accompanying drawing, and its scope will be pointed out in the appended claims.

Referring to the drawing, there is shown one embodiment of analyzing apparatus constructed in accordance with the present invention.

Description and operation of the invention

Referring to the drawing, the apparatus of this invention comprises means responsive to a mixture to be analyzed for separating the components of the mixture. This separation may be performed by a gas chromatographic system 10 of conventional construction and operation. Briefly, a source of carrier gas 11, which may be helium under pressure, is connected through suitable gas regulation means 12 to a sample injector 13 whereat a sample of the mixture to be analyzed is injected into the moving stream of carrier gas. The sample and carrier gas are introduced via valve 14 into a chromatographic column 15 whereat the components of the sample are separated. Chromatographic column 15 may be a conventional packed or capillary column. The various components of the sample emerge or elute from the chromatographic column 15 at different times in accordance with their respective characteristics.

The moving stream of carrier gas and components passes through a valve 16 and is split by a stream splitter represented by junction 17. The split ratio is dependent upon various design and practical considerations. One portion of the stream is supplied along a passage 17a to a detector 18 which may be a flame ionization detector of conventional construction and operation. Sample injector 13, column 15, stream splitter 17, and detector 18 are all enclosed within a temperature controlled chamber (not shown) which may be of the thermostatted air bath type.

The detector 18 provides an electrical output signal representative of the quantity of each of the separated components moving along passage 17a. This electrical signal may, in turn, be supplied to an amplifier 19 and a recorder 20 whereat visual indications of the components are developed. By measuring the quantity of each component moving along passage 17a and knowing the split ratio at stream splitter 17, the quantity of each component eluting from column 15 may be determined.

The apparatus of the invention also includes means responsive to the components of the mixture for identifying the components. This identification may be performed by a mass spectrometer 30 of conventional construction and operation. Briefly, that portion of the moving stream of carrier gas and components not supplied to the flame ionization detector 18 is supplied through a passage 17b and a suitable isolation valve 31 to a reservoir 32. The pressure of reservoir 32 is set by a vacuum pump 33, a valve 34, and a pneumatic resistance of passage 17b. Reservoir 32 acts as a holding volume for the components being analyzed. This is necessary to prevent the mixture components from being pushed too rapidly into an ionization chamber 35 which is operated at pressures considerably lower than the pressures existing at junction 17. Interposed between the reservoir 32 and the ionization chamber 35 is a leak passage 36. The pressure in reservoir 32 is adjusted to a level higher than the pressure in ionization chamber 35 and lower than the pressures at junction 17 so that the individual components in the reservoir leak off into the ionization chamber at a proper rate. In most applications, passage 17b will be of capillary dimensions so that it will act as a restricter and effect the necessary pressure drop from junction 17 to reservoir 32.

The components are individually ionized in ionization chamber 35 in the usual way and are then supplied to the magnet scan 37 and detector 38. The magnet scan 37 and the detector 38, operating in the conventional way, provide frequency spectrums of the components. The output of the detector 38 may, in turn, be supplied to an amplifier 39 and a recorder 40 whereat visual indications of the components are developed.

The apparatus of the invention finally includes means 50 for controlling the rate at which the components eluting from the chromatographic system 10 are supplied to the mass spectrometer 30. Various techniques may be employed for effecting this control. One preferred technique is to control the fluid in the chromatographic system 10. One mode of operation is to isolate chromatographic column 15 after an eluted component is detected by detector 18, the isolation lasting for a period of time sufficient to permit the mass spectrometer 30 to scan the component. During the isolation of chromatographic column 15, the remaining separated components are "stored" in the column. Loss of resolution in the column 15 due to diffusion occurs slowly.

The apparatus for effecting the isolation of column 15 may comprise a valve control circuit 51, a pair of solenoid windings 14a and 16a which actuate valves 14 and 16, respectively, and a by-pass passage 52. Ordinarily, sample and carrier gas flow through valves 14 and 16 along the solid line passages in the drawing. At prescribed times, valve control circuit 51 supplies signals to windings 14a and 16a which cause the valves to switch. By this time the sample is in chromatographic column 15. Carrier gas flows through the dotted line passage of valve 14, the by-pass passage 52 and the dotted line passage of valve 16 to junction 17.

If the elution times of the components are known, valve control circuit 51 may be pre-programmed; that is, valve control circuit 51 actuates valves 14 and 16 at definite times corresponding to the elution times of the components by internally generated command signals. In the absence of prior knowledge as to the elution times of the components, valve control circuit 52 may be made responsive to the gas chromatograph 10 as indicated by the dotted line between recorder 20 and the valve control circuit. As a component is detected, the electrical input signal to the recorder 20 or the mechanical movement of the recorder may be sensed by the valve control circuit 51 and valves 14 and 16 are actuated accordingly. Whether preprogrammed or made responsive to the gas chromatograph, valve control circuit 51 may be composed of conventional control circuit components arranged to automatically control valves 14 and 16 at the proper times.

Valve 31 serves to close off reservoir 32 from passage 17b. To insure that the separated components do not recombine in reservoir 32, valve 31 is preferably made to close after each component enters the reservoir. Prior to closing valve 31, valve 34 is also closed to keep the component trapped in the reservoir 32. The only remaining leakage path, therefore, is leak passage 36. Valve 31 is shown to be actuated by a solenoid winding 31a. Both valves 31 and 34 may be controlled in the same way by valve control circuit 51 as are valves 14 and 16.

In another from of the present invention, instead of isolating column 15, the flow rate of the carrier gas may be controlled. The carrier gas flow may either be slowed down sufficiently or completely interrupted. In this embodiment, the by-pass passage 52 is removed and valves 14 and 16 are replaced by direct connections. Regulator 12 would now be made to respond to valve control circuit 51. If complete interruption of carrier gas flow is desired, regulator 12 would simply open and close on command of the valve control circuit 51. If all that is desired is a reduction in carrier gas flow rate, regulator 12 would be controlled to open and close a specified amount.

A second preferred technique for controlling the rate at which the components eluting from the chromatographic system 10 are supplied to the mass spectrometer 30 is by controlling the temperature of the chromatographic column 15. If after an eluted component is detected by detector 18, the temperature of the chromatographic column 15 is sufficiently reduced, the remaining components of the sample are "frozen" in the column. This "freezing" of the column is made to last for a period of time sufficient to permit the mass spectrometer 30 to scan the eluted component. Upon completion of the analysis by the mass spectrometer 30, the temperature of the chromatographic column 15 is raised to its normal operating level so that further separation and elution of components may take place. It is obvious that means 50 may be modified to effect this mode of control without departing from the specific techniques described above.

Another technique for controlling the rate at which the components eluting from the chromatographic system 10 are supplied to the mass spectrometer 30 is a combination of controlling the fluid flow in the chromatographic system and the temperature of the chromatographic column 15. It is very likely that under many practical situations this combination will be most desirable.

While there has been described what is at present considered to be the preferred embodiments of the present invention, it will be obvious to those skilled in the art that various changes and modifications may be made therein without departing from the invention, and it is therefore aimed to cover all such changes and modifications as fall within the true spirit and scope of the invention.

What is claimed is:

1. Apparatus for analyzing a mixture comprising:
a gas chromatographic system wherein a carrier gas transports said mixture through a chromatographic column for separating the components of said mixture and for determining the quantity of each component;
a mass spectrometer responsive to said components for identifying said components;
and carrier gas by-pass means coupled across said column for reducing the flow of said carrier gas in said column to isolate said chromatographic column after a component is detected by said gas chromatographic system for a period of time sufficient to permit said mass spectrometer to scan said component and identify said component.

2. Apparatus for analyzing a mixture comprising:
a gas chromatographic system wherein a carrier gas transports said mixture through a chromatographic column for separating the components of said mixture and for determining the quantity of each component;
a mass spectrometer responsive to said components for identifying said components;
and means responsive to said gas chromatographic system including carrier gas by-pass means coupled across said column for reducing the flow of said carrier gas in said column to isolate said chromatographic column after a component is detected by said gas chromatographic system for a period of time sufficient to permit said mass spectrometer to scan said component and identify said component.

3. Apparatus for analyzing a mixture comprising:
a gas chromatographic system wherein a carrier gas transports said mixture through a chromatographic column for separating the components of said mixture and for determining the quantity of each component;
a mass spectrometer responsive to said components for identifying said components;
and means for reducing the temperature of said chromatographic column after a component is detected by said chromatographic system for a period of time sufficient to permit said mass spectrometer to scan said component and identify said component.

4. Apparatus for analyzing a mixture comprising:
a gas chromatographic system wherein a carrier gas transports said mixture through a chromatographic column for separating the components of said mixture and for determining the quantity of each component;
a mass spectrometer responsive to said components for identifying said components;

and means responsive to said chromatographic system for reducing the temperature of said chromatographic column after a component is detected by said gas chromatographic system for a period of time sufficient to permit said mass spectrometer to scan said component and identify said component.

5. Apparatus for analyzing a mixture comprising;
a gas chromatographic system wherein a carrier gas transports said mixture through a chromatographic column for separating the components of said mixture and for determining the quantity of each component;
a mass spectrometer responsive to said components for identifying said components;
and means for isolating said chromatographic column and for reducing the temperature of said gas chromatographic column after a component is detected by said chromatographic system for a period of time sufficient to permit said mass spectrometer to scan said component and identify said component.

References Cited by the Examiner
UNITED STATES PATENTS 2,959,677  11/1960  Robinson et al. _____ 250—43.5

OTHER REFERENCES

Gas Chromatography, Academic Press, New York, published 1962; pp. 195 to 205.

The Encyclopedia of Spectroscopy, edited by Clark; "Gas Chromatography Identifications"; Reinhold Publishing Corporation, New York, published 1960, pp. 605 to 607.

RALPH G. NILSON, *Primary Examiner.*

ARCHIE R. BORCHELT, *Examiner.*

A. L. BIRCH, *Assistant Examiner.*